United States Patent
Jin et al.

(10) Patent No.: US 10,872,224 B2
(45) Date of Patent: Dec. 22, 2020

(54) SMART CARD

(71) Applicant: SILICON DISPLAY TECHNOLOGY, Yongin-si (KR)

(72) Inventors: Jong Woo Jin, Seoul (KR); Taehan Go, Seoul (KR); Youn Duck Nam, Suwon-si (KR)

(73) Assignee: SILICON DISPLAY TECHNOLOGY, Yongin-si (KR)

( * ) Notice: Subject to any disclaimer, the term of this patent is extended or adjusted under 35 U.S.C. 154(b) by 0 days.

Patent file contains an affidavit/declaration under 37 CFR 1.130(b).

(21) Appl. No.: 16/669,739

(22) Filed: Oct. 31, 2019

(65) Prior Publication Data

US 2020/0160024 A1 May 21, 2020

(30) Foreign Application Priority Data

Nov. 15, 2018 (KR) .................. 10-2018-0140888

(51) Int. Cl.
  *G06K 9/00* (2006.01)
  *G06K 19/07* (2006.01)

(52) U.S. Cl.
  CPC ....... *G06K 9/0004* (2013.01); *G06K 19/0718* (2013.01); *G06K 2009/0006* (2013.01)

(58) Field of Classification Search
  None
  See application file for complete search history.

(56) References Cited

U.S. PATENT DOCUMENTS 9,245,167 B2  1/2016 Carver et al.
2013/0036463 A1* 2/2013 Shashidhar .......... G06Q 20/341
                                                           726/20

FOREIGN PATENT DOCUMENTS

| KR | 1992-0010481 | 11/1992 |
| KR | 10-2014-0053171 | 5/2014 |
| KR | 10-1721897 | 4/2017 |
| KR | 10-2018-0001055 | 1/2018 |

* cited by examiner

*Primary Examiner* — Kristy A Haupt
(74) *Attorney, Agent, or Firm* — Lex IP Meister, PLLC (57) ABSTRACT

A smart card according to an exemplary embodiment of the present invention includes: a transparent substrate including a side contacting a finger of a user; a reflection layer separated from the transparent substrate, facing the transparent substrate, and including a metal material; a photosensor provided between the transparent substrate and the reflection layer, and sensing light reflected and input from the reflection layer; and a card substrate including an opaque material and covering the reflection layer.

15 Claims, 8 Drawing Sheets

SMART CARD

CROSS-REFERENCE TO RELATED APPLICATION

This application claims priority to and the benefit of Korean Patent Application No. 10-2018-0140888 filed in the Korean Intellectual Property Office on Nov. 15, 2018, the entire contents of which are incorporated herein by reference.

BACKGROUND OF THE INVENTION

(a) Field of the Invention

A smart card is provided.

(b) Description of the Related Art

A fingerprint recognition technique represents a skill for electronically reading a fingerprint of a finger of a user, comparing the same with previously input data, and distinguishing an identity to confirm the identity of the user, and it has excellent safety and convenience from among biometrics, it allows a low manufacturing cost, and it suggests a simple configuration of elements and various form factors, so it is applicable to extensive fields such as finance, criminal investigations, and security.

In general, a smart card signifies an electronic card made of a plastic material into which a driving chip or a memory is installed, and the smart card is widely used for final institutions, medical insurance cards, identity recognition, transportation cards, and credit cards. For the purpose of security of the smart card, a fingerprint sensor may be included in the smart card. When the fingerprint sensor is installed in the smart card, it may be determined whether a user can appropriately use the smart card by using a fingerprint, so the security in the use of the smart card may be improved.

The smart card must have a bendable or flexible characteristic to some degree, and a thickness of the smart card is to be limited to be equal to or less than a specific thickness so that the user may not perceive it as uncomfortable, and there may be limits in applying biometric techniques other than fingerprint recognition for security of the smart card.

A fingerprint recognition sensor applicable to the smart card may be capacitive or optical. From among them, the optical fingerprint recognition sensor may use ambient light, a light source installed in the smart card, or a light source installed in a card reader, and it may be more advantageous in high-resolution as it may have a simpler pixel configuration than the capacitive fingerprint recognition sensor.

On the other hand, when the fingerprint recognition sensor to be combined to the smart card needed to guarantee bending or flexibility is a TFT-type smart card driven by a thin film transistor (TFT), the fingerprint recognition sensor may be generally manufactured by forming a flexible substrate including a material such as polyimide (PI) on a glass substrate, forming a fingerprint recognition sensor array on the flexible substrate, and separating the flexible substrate from the glass substrate. However, the yield may be deteriorated because of a process for separating the flexible substrate from the glass substrate.

Further, regarding the optical fingerprint recognition sensor and the capacitive fingerprint recognition sensor, it is needed to protect the fingerprint recognition sensor from being damaged when a surface of the fingerprint recognition sensor is scratched or impacted, and for this purpose, a cover layer or a coating layer for covering the fingerprint recognition sensor array may be additionally formed after the fingerprint recognition sensor array is formed. However, the material usable as the cover layer or the coating layer may have limits since it must be transparent and flexible.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a smart card for reducing a number of manufacturing processes.

The present invention has been made in another effort to provide a smart card for reducing a manufacturing expense.

The present invention has been made in another effort to provide a smart card for improving a yield.

The present invention has been made in another effort to provide a smart card for minimizing damage to internal parts and improving reliability.

Exemplary embodiments according to the present invention may be used to realize other tasks that are not mentioned in detail, in addition to the above-noted tasks.

An exemplary embodiment of the present invention provides a smart card including: a transparent substrate including a side contacting a finger of a user; a reflection layer separated from the transparent substrate, facing the transparent substrate, and including a metal material; a photosensor provided between the transparent substrate and the reflection layer, and sensing light reflected and input from the reflection layer; and a card substrate including an opaque material and covering the reflection layer.

Light passing through the finger and input to the transparent substrate from among ambient light may be reflected from the reflection layer and may be input to the photosensor.

Light passing through a ridge of the fingerprint and input to the transparent substrate may be reflected from the reflection layer and may be input to the photosensor.

The smart card may further include a light source embedded in the card substrate, provided on a side of the transparent substrate, and irradiating light to the transparent substrate, wherein light totally reflected from one side of the transparent substrate from among light irradiated from the light source may be reflected from the reflection layer and may be input to the photosensor.

Total reflection may be generated on a portion corresponding to a valley of the fingerprint on one side of the transparent substrate.

The smart card may further include a light guide unit embedded in the card substrate, provided on a side of the transparent substrate, and guiding light irradiated by an external light source to the transparent substrate, wherein light guided to the transparent substrate and totally reflected on one side of the transparent substrate from among light irradiated from the external light source may be reflected from the reflection layer and may be input to the photosensor.

The smart card may further include a guide reflection layer including an opaque material and provided on the light guide unit.

Total reflection may be generated on a portion corresponding to a valley of the fingerprint on one side of the transparent substrate.

The transparent substrate may include glass, and a thickness may be equal to or less than 100 μm.

The transparent substrate may be a transparent plastic substrate.

The transparent substrate may be flexible.

The smart card may further include a planarization layer provided between a photosensor and a reflection layer.

The photosensor may include a first electrode provided on the transparent substrate, a semiconductor layer provided on the first electrode, and a second electrode including a transparent material and provided on the semiconductor layer, and the first electrode and the second electrode may form a capacitor.

A fingerprint recognition area may be provided on part of the smart card, and the reflection layer and the photosensor may be provided in the fingerprint recognition area.

The smart card according to an exemplary embodiment of the present invention may reduce the number of manufacturing processes, may reduce the manufacturing cost, may improve the yield, may minimize damage to the internal parts, and may improve reliability.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive, and like reference numerals designate like elements throughout the specification. Further, a detailed description of a well-known related art will be omitted.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. When an element is referred to as being "directly on" another element, there are no intervening elements present. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Unless explicitly described to the contrary, the word "comprise" and variations such as "comprises" or "comprising" will be understood to imply the inclusion of stated elements but not the exclusion of any other elements.

In the present specification, the smart card may include other constituent elements such as a memory, and descriptions thereof may be omitted.

Figure 1:
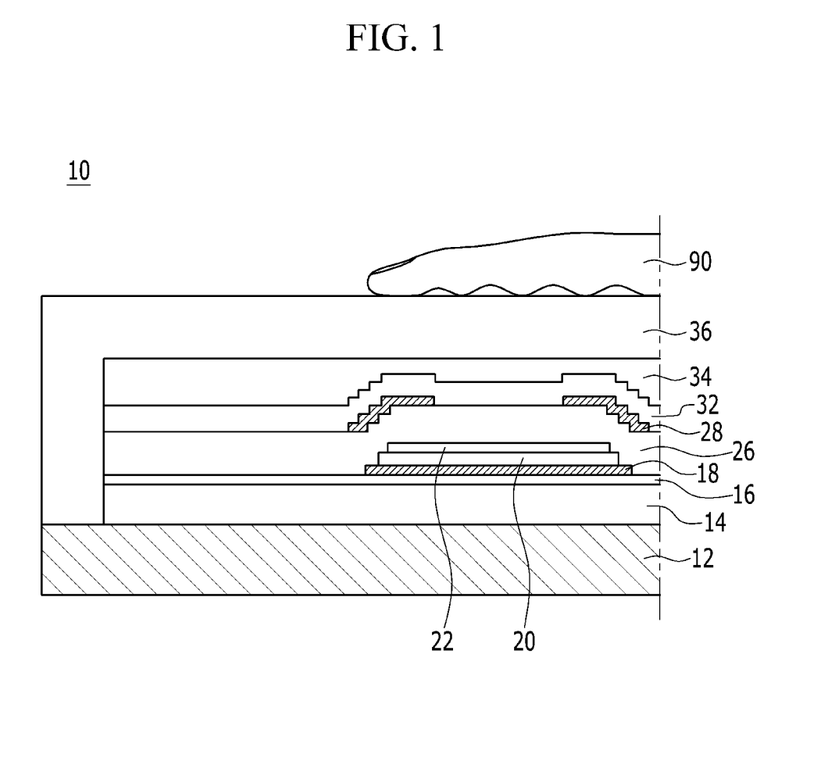
FIG. 1 shows a cross-sectional view of a general smart card.

FIG. 1 shows a cross-sectional view of a general smart card.

Referring to FIG. 1, a general smart card 10 includes a card substrate 12, a flexible substrate 14 provided on the card substrate 12, a first insulation layer 16 provided on the flexible substrate 14, photosensors 18, 20, and 22 provided on the first insulation layer 16, a second insulation layer 26 provided on the photosensors 18, 20, and 22, a bias electrode 28 provided on the second insulation layer 26, a third insulation layer 32 and a planarization layer 34 sequentially provided on the bias electrode 28, and a passivation layer 36 for covering the planarization layer 34.

The card substrate 12 is a support member for the smart card 10, and it may be made of an opaque material.

The smart card 10 needs to be bent by a predetermined level or be flexible, and for this, the flexible substrate 14 may have flexibility, and the flexible substrate 14 may be made of a material such as a polyimide.

The passivation layer 36 represents a portion contacted by a user's finger 90, so the passivation layer 36 is made of a material that has scrape or scratch resistance, and it has to be made of a transparent material since the light passing through the finger 90 must reach the photosensors 18, 20, and 22.

The general smart card 10 may be manufactured by stacking the flexible substrate 14 on a glass substrate (not shown), forming photosensors 18, 20, and 22, a thin film transistor (not shown), a planarization layer 34, and a passivation layer 36 on the flexible substrate 14, peeling elements on the glass substrate (not shown) from the glass substrate (not shown), and attaching the elements peeled from the glass substrate (not shown) to the card substrate 12.

However, upper elements may be separated from each other or may be damaged by the process for peeling the upper elements (the elements provided on the glass substrate) including the flexible substrate 14 from the glass substrate (not shown), and the yield of the smart card 10 may be accordingly reduced.

In comparison to this, in the case of the smart card according to exemplary embodiments, the glass substrate (or a transparent substrate) used in the process for forming a photosensor or a thin film transistor is not peeled, and the glass substrate (or a transparent substrate) may function as a passivation layer for protecting the photosensor or the thin film transistor, thereby preventing the photosensor or the thin film transistor from being damaged or separated, and substantially increasing the yield of the smart card.

Further, the smart card according to exemplary embodiments does not include an additional passivation layer besides the glass substrate (transparent substrate) and it does not include a polymer material layer (a flexible substrate) such as a polyimide for providing flexibility, so the process for forming a passivation layer and the process for forming a polymer material layer may be omitted, the processes may be simplified, and the process expense may be reduced.

Hereinafter, a smart card according to the above-described exemplary embodiments will now be described with reference to drawings.

Figure 2:
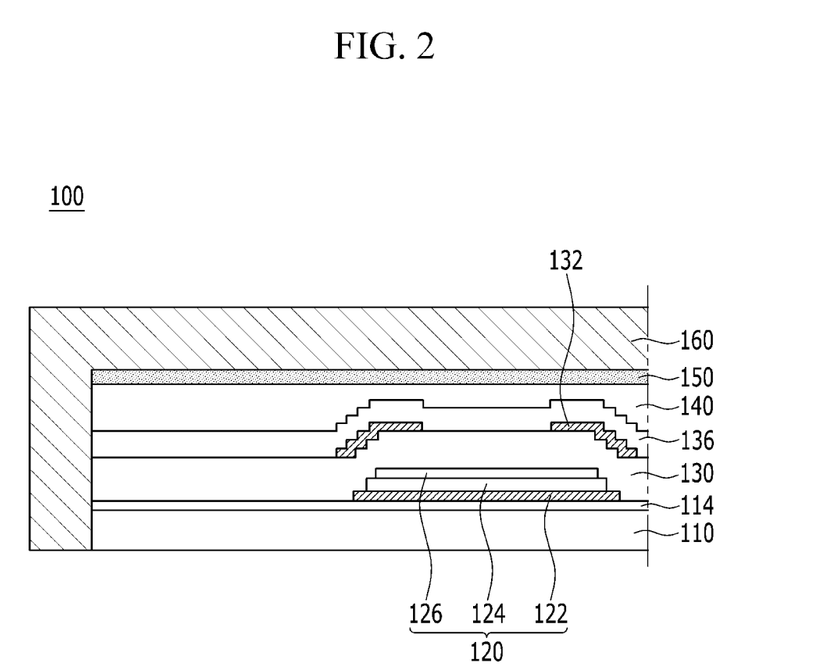
FIG. 2 shows a cross-sectional view of a smart card according to an exemplary embodiment.

FIG. 2 shows a cross-sectional view of a smart card according to an exemplary embodiment.

Referring to FIG. 2, the smart card 100 includes a transparent substrate 110 contacted by the user's finger, a photosensor 120 provided on the transparent substrate 110, a reflection layer 150 provided on the photosensor 120, and a card substrate 160 for covering the reflection layer 150.

The smart card 100 shown in FIG. 2 shows a portion including the photosensor 120 and recognizing the fingerprint, and although not shown in the drawing, the card substrate 160 may cover other elements such as a memory and may protect the same.

In the case of the general smart card 10, the glass substrate is used so as to support the flexible substrate 14 while the process for forming the elements such as the photosensors 18, 20, and 22 and the thin film transistor (not shown), and the glass substrate is removed when the elements on the flexible substrate 14 are formed. In the process for removing the glass substrate, upper elements may be separated or damaged.

On the contrary, in the case of the smart card 100 according to an exemplary embodiment, an element such as a photosensor 120 is formed on the transparent substrate 110, there is no need to install a layer made of a polymer material such as a polyimide, and the transparent substrate 110 is not subsequently peeled, so the number of manufacturing processes may be substantially reduced, the manufacturing cost may be substantially reduced, and the yield may be substantially increased.

The transparent substrate 110 may include glass. The smart card 100 must have a predetermined degree of bending or flexibility. To provide flexibility to the transparent substrate 110, the transparent substrate 110 may be polished, and the thickness of the transparent substrate 110 including glass may be equal to or less than about 100 µm. Within the above-noted range, the flexible transparent substrate 110 with predetermined bendability or flexibility may be realized.

As described above, the transparent substrate 110 is a base layer for forming an upper element, and it is also a cover layer or a passivation layer for protecting the smart card 100 from external impacts or scratches.

In the case of the general smart card 10, the flexible substrate 14 is stacked on the card substrate 12, and an additional passivation layer 36 is provided on the elements such as the photosensors 18, 20, and 22. In this instance, the user's finger 90 may contact the passivation layer 36.

On the contrary, in the case of the smart card 100 according to an exemplary embodiment, the transparent substrate 110 functions as a passivation layer, so there is no need to install an additional layer, thereby reducing the number of manufacturing processes and the manufacturing expense. The user's finger (not shown) may contact the transparent substrate 110.

The transparent substrate 110 may be a transparent plastic substrate, and the transparent substrate 110 may be flexible. In this case, an element such as the photosensor 120 is formed on the transparent plastic substrate 110. There is no need to install a layer made of a polymer material such as a polyimide in the smart card 100, and the transparent plastic substrate 110 may protect the elements such as the photosensor 120. Therefore, the stage for peeling the transparent substrate 110 may be eliminated from the process for manufacturing a smart card, thereby substantially reducing the number of manufacturing processes and the manufacturing expense of the smart card 100, and substantially increasing the yield of the smart card 100.

The photosensor 120 includes a first electrode 122 provided on the transparent substrate 110, a semiconductor layer 124 provided on the first electrode 122, and a second electrode 126 including a transparent material and provided on the semiconductor layer 124. Here, the semiconductor layer 124 may, for example, include amorphous silicon (a-Si), an organic material, or quantum dots. The first electrode 122 and the second electrode 126 may form a capacitor.

The thin film transistor (TFT) may drive the photosensor 120, and may transmit a current signal caused by generation of charges of the photosensor 120 to the outside. In this instance, the thin film transistor may, for example, have one of a co-planar structure, a staggered structure, an inverted co-planar structure, and an inverted staggered structure.

Between the transparent substrate 110 and the first electrode 122, a first insulation layer 114 may be provided, and a second insulation layer 130 for covering the photosensor 120 may be provided.

A bias electrode 132 may be provided on a portion corresponding to the photosensor 120 on the second insulation layer 130.

Further, a third insulation layer 136 for covering the bias electrode 132 may be provided.

The first insulation layer 114, the second insulation layer 130, and the third insulation layer 136 may include transparent materials, and they may prevent refraction of light as they have the same-level refractive index.

A planarization layer 140 may be formed on the third insulation layer 136, and the planarization layer 140 may minimize light being influenced by curves of the photosensor 120, the thin film transistor, and the insulation layers 114, 130, and 136 at the bottom. The planarization layer 140 may also include a transparent material, and may have the same-level refractive index as the insulation layers 114, 130, and 136.

The reflection layer 150 is provided on the planarization layer 140.

The reflection layer 150 is separated from the transparent substrate 110, and faces the transparent substrate 110. The reflection layer 150 may include an opaque metal and may reflect incident light.

In the case of the general smart card 10, the user's finger 90 contacts the passivation layer 36, and the light passing through the finger 90 is input to the photosensors 18, 20, and 22 and is then sensed.

On the contrary, the smart card 100 according to an exemplary embodiment has a configuration in which a user's finger (not shown) contacts the transparent substrate 110 provided on the bottom of the photosensor 120, and the light passing through a finger (not shown) or totally reflected from one side of the transparent substrate is input to the card substrate 160 from the transparent substrate 110. Therefore, the reflection layer 150 may change the direction of light, and the light reflected from the reflection layer 150 may be input to the photosensor 120.

The photosensor 120 may sense the incident light to generate a current signal.

The smart card 100 includes a card substrate for covering the reflection layer 150 and lower structures.

The card substrate 160 may include an opaque plastic material, and it functions to protect the elements such as the above-noted transparent substrate 110, the photosensor 120, and the reflection layer 150, and support the same.

Hereinafter, detailed descriptions on the portions that repeat the above-described constituent elements may be omitted.

Figure 3A:
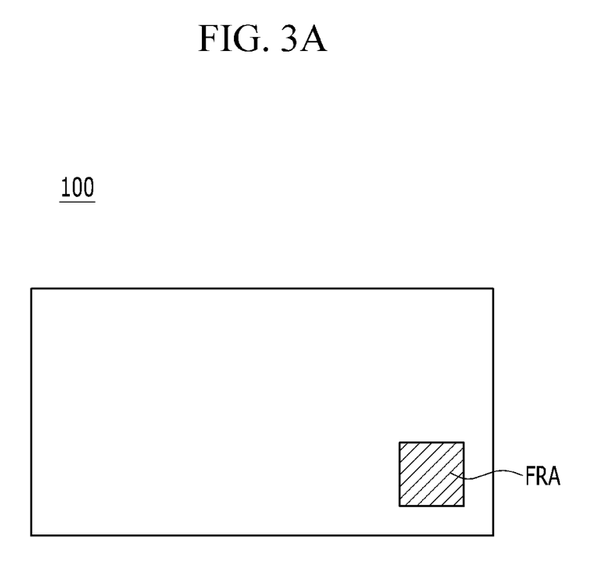
FIG. 3A shows a plan view of a smart card according to an exemplary embodiment.
Figure 3B:
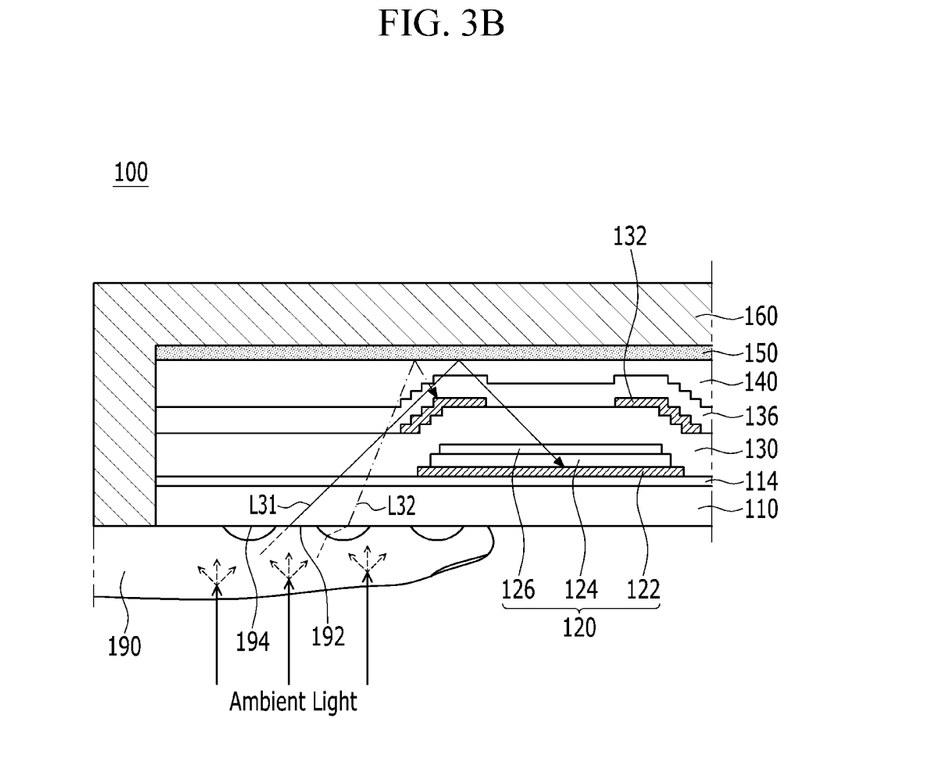
FIG. 3B shows a cross-sectional view of an FRA in a smart card of FIG. 3A.

FIG. 3A shows a plan view of a smart card according to an exemplary embodiment, and FIG. 3B shows a cross-sectional view of an FRA in a smart card of FIG. 3A.

Referring to FIG. 3A, the smart card 100 may include a fingerprint recognition area (FRA) in a predetermined region for the purpose of security, and the user may be determined to be an appropriate user by contacting the fingerprint recognition area (FRA) by his finger. The fingerprint recognition area (FRA) shown in FIG. 3A is one example, and it may have various forms or sizes if needed.

Referring to FIG. 3B, light having passed through the finger 190 and input to the transparent substrate 110 from among ambient light may be reflected from the reflection layer 150 and may be input to the photosensor 120. When the ambient light is input to the finger 190, the light may be scattered and reflected inside the finger 190, and some ($L_{31}$ and $L_{32}$) of the scattered light may be input to the transparent substrate 110.

The light $L_{31}$ input by passing through a ridge 192 of a fingerprint of the finger 190 from among the light $L_{31}$ and $L_{32}$ input to the transparent substrate 110 may be reflected from the reflection layer 150 and may be sensed by the photosensor 120.

On the contrary, the light $L_{32}$ that is input through a valley 194 of the fingerprint of the finger 190 from among the light $L_{31}$ and $L_{32}$ input to the transparent substrate 110 forms a small incident angle toward the reflection layer 150, so it may not be input to the photosensor 120 because of an opaque structure such as the bias electrode 132.

In further detail, an average refractive index of the smart card 100 may be greater than the refractive index (about 1.0) of air, and the refractive index of the finger may be greater than the refractive index of the air. Therefore, the light having passed through the finger passes through the valley 194 of the fingerprint and is input to the air between the valley 194 of the fingerprint and the transparent substrate 110, and the light input into the air is input to the smart card 100, so the incident angle of the light $L_{32}$ provided toward the reflection layer 150 from the transparent substrate 110 may be relatively small according to Snell's law.

The fingerprint image generated in the fingerprint recognition area (FRA) of the smart card 100 shown in FIG. 3B includes a bright region and a dark region, and the ridge 192 of the fingerprint may correspond to the bright region since the light $L_{31}$ input to the transparent substrate 110 through the ridge 192 of the above-noted fingerprint is input to the photosensor 120, and the valley 194 of the fingerprint may correspond to the dark region since the light $L_{32}$ input to the transparent substrate 110 through the valley 194 of the fingerprint is not input to the photosensor 120.

Figure 4A:
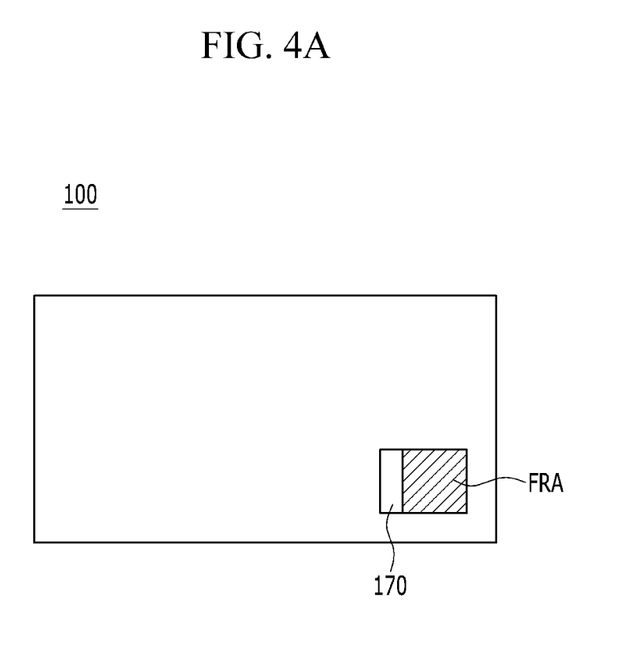
FIG. 4A shows a plan view of a smart card according to an exemplary embodiment.
Figure 4B:
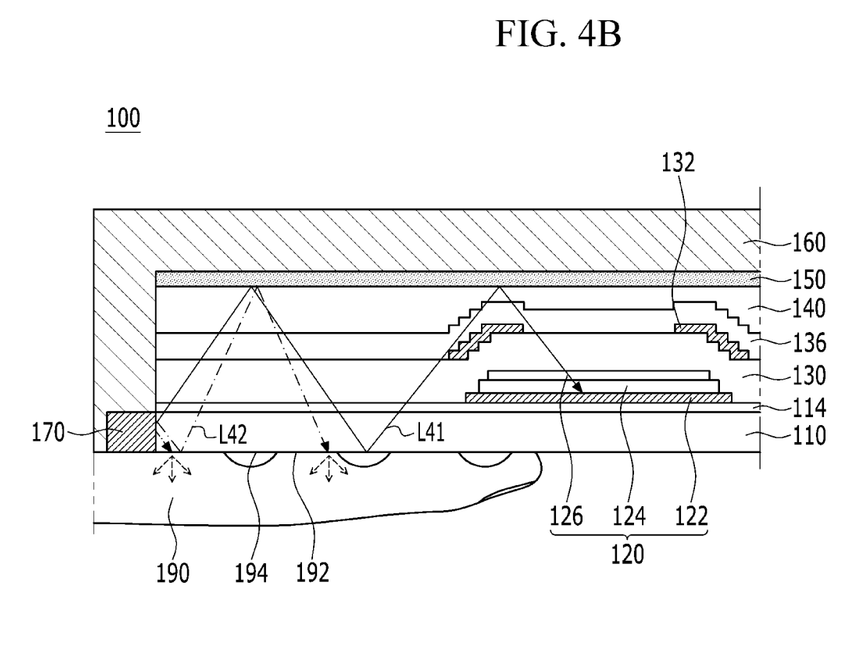
FIG. 4B shows a cross-sectional view of an FRA in a smart card of FIG. 4A.

FIG. 4A shows a plan view of a smart card according to an exemplary embodiment, and FIG. 4B shows a cross-sectional view of an FRA in a smart card of FIG. 4A.

Referring to FIG. 4A, the smart card 100 may include a fingerprint recognition area (FRA) in a predetermined region for the purpose of security, and it may further include a light source 170 provided on a side of the fingerprint recognition area (FRA).

Referring to FIG. 4B, the light source 170 is filled in the card substrate 160, it may be provided on the side of the transparent substrate 110, and it may irradiate light to the transparent substrate 110.

The light $L_{41}$ totally reflected from one side of the transparent substrate 110 from among the light $L_{41}$ and $L_{42}$ irradiated by the light source 170 may be reflected from the reflection layer 150 and may be input to the photosensor 120.

For example, the light $L_{41}$ irradiated from the light source 170 and totally reflected from the portion corresponding to the valley 194 of the fingerprint on one side of the transparent substrate 110 may be input to the reflection layer 150. On the contrary, the light $L_{42}$ irradiated from the light source 170 and having reached the portion that corresponds to the ridge 192 of the fingerprint from one side of the transparent substrate 110 may be absorbed into the finger 190, may be scattered, and some of it may be reflected.

Therefore, regarding the fingerprint image generated in the fingerprint recognition area (FRA) of the smart card 100 of FIG. 4B, the valley 194 of the fingerprint may correspond to the bright region, and the ridge 192 of the fingerprint may correspond to the dark region.

Figure 5A:
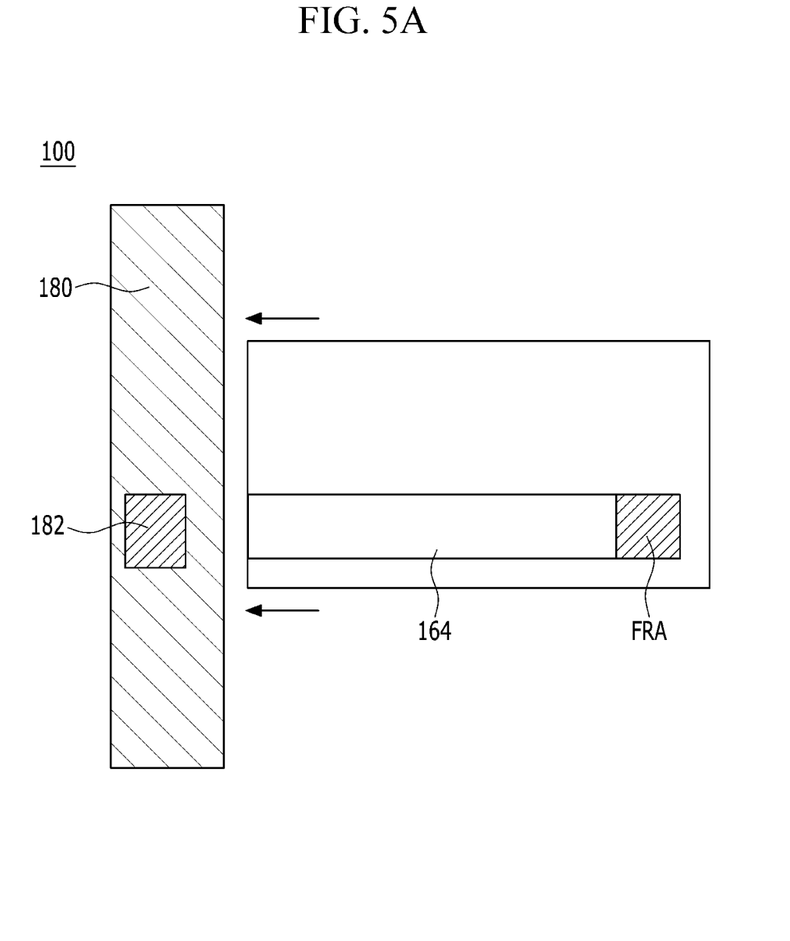
FIG. 5A shows a plan view of a smart card and an external card reader according to an exemplary embodiment.
Figure 5B:
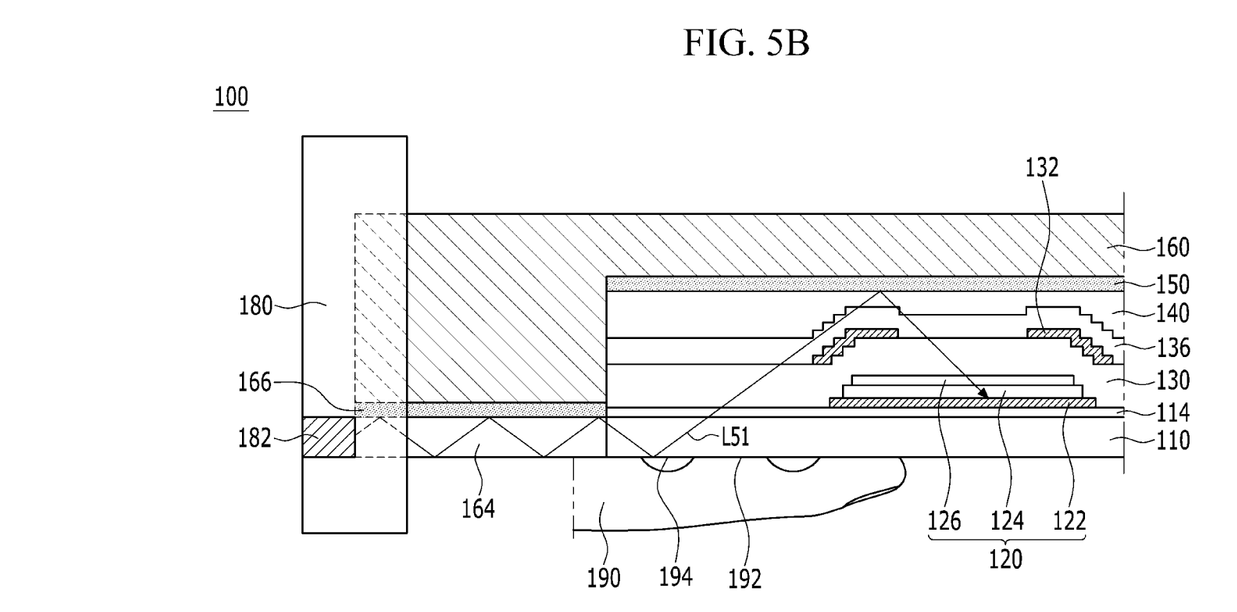
FIG. 5B shows a cross-sectional view when a smart card and a card reader of FIG. 5A are combined.

FIG. 5A shows a plan view of a smart card and an external card reader according to an exemplary embodiment, and FIG. 5B shows a cross-sectional view when a smart card and a card reader of FIG. 5A are combined. FIG. 5A and FIG. 5B show the case in which fingerprint recognition is performed by using an external light source while a smart card is combined to various card readers provided at the outside.

Referring to FIG. 5A, the smart card 100 includes a fingerprint recognition area (FRA) in a predetermined region, and it further includes a light guide unit 164 provided on the side of the fingerprint recognition area (FRA). An external card reader 180 includes an external light source 182.

Referring to FIG. 5B, the light guide unit 164 may be embedded in the card substrate 160, it may be provided on a side of the transparent substrate 110, and it may guide the light irradiated by the external light source 182 to the transparent substrate 110.

The external light source 182 may be included in the external card reader 180, and the smart card 100 may be combined to the card reader 180 so that the external light source 182 may be provided on a side of the light guide unit 164.

The light guide unit 164 may further include a guide reflection layer 166 including an opaque material and provided on the light guide unit 164. The guide reflection layer 166 may be irradiated from the external light source 182 to thus increase an amount of light reaching the transparent substrate 110 and increasing light efficiency.

The light $L_{51}$ guided to the transparent substrate 110 and totally reflected from one side of the transparent substrate 110 from among the light irradiated by the external light source 182 may be reflected from the reflection layer 150 and may be input to the photosensor 120. In this instance, the total reflection may be generated at the portion corresponding to the valley 194 of the fingerprint on one side of the transparent substrate 110. In a like manner of the smart card 100 shown in FIG. 4B, the light may be absorbed or scattered on the portion corresponding to the ridge 192 of the fingerprint on one side of the transparent substrate 110, so the light may be extinguished.

Although not shown, a user certifier (not shown) may be included in the smart card 100, and the user certifier (not shown) may determine whether to activate the smart card 100 based on whether a user's fingerprint image generated in the fingerprint recognition area (FRA) corresponds to a stored user's fingerprint image.

Further, the smart card 100 may include a battery for driving elements such as the photosensor 120, and it may include a display device (not shown) when the smart card 100 is a device such as a one-time password (OTP) device.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A smart card comprising:
a transparent substrate including a side contacting a finger of a user;
a reflection layer separated from the transparent substrate, facing the transparent substrate, and including a metal material;
a photo-sensor provided between the transparent substrate and the reflection layer, and sensing light reflected and input from the reflection layer; and
a card substrate including an opaque material and covering the reflection layer.

2. The smart card of claim 1, wherein
light passing through the finger and input to the transparent substrate from among ambient light is reflected from the reflection layer and is input to the photosensor.

3. The smart card of claim 2, wherein
light passing through a ridge of the fingerprint and input to the transparent substrate is reflected from the reflection layer and is input to the photosensor.

4. The smart card of claim 1, further comprising
a light source embedded in the card substrate, provided on a side of the transparent substrate, and irradiating light to the transparent substrate,
wherein light totally reflected from one side of the transparent substrate from among light irradiated from the light source is reflected from the reflection layer and is input to the photosensor.

5. The smart card of claim 4, wherein
total reflection is generated on a portion corresponding to a valley of the fingerprint on one side of the transparent substrate.

6. The smart card of claim 1, further comprising
a light guide unit filled in the card substrate, provided on a side of the transparent substrate, and guiding light irradiated by an external light source to the transparent substrate,
wherein light guided to the transparent substrate and totally reflected on one side of the transparent substrate from among light irradiated from the external light source is reflected from the reflection layer and is input to the photosensor.

7. The smart card of claim 6, further comprising
a guide reflection layer including an opaque material and provided on the light guide unit.

8. The smart card of claim 6, wherein
total reflection is generated on a portion corresponding to a valley of the fingerprint on one side of the transparent substrate.

9. The smart card of claim 1, wherein
the transparent substrate includes glass, and a thickness is equal to or less than 100 µm.

10. The smart card of claim 1, wherein
the transparent substrate is a transparent plastic substrate.

11. The smart card of claim 9, wherein
the transparent substrate is flexible.

12. The smart card of claim 10, wherein
the transparent substrate is flexible.

13. The smart card of claim 1, further comprising
a planarization layer provided between the photosensor and the reflection layer.

14. The smart card of claim 1, wherein
the photosensor includes a first electrode provided on the transparent substrate, a semiconductor layer provided on the first electrode, and a second electrode including a transparent material and provided on the semiconductor layer, and the first electrode and the second electrode form a capacitor.

15. The smart card of claim 1, wherein
a fingerprint recognition area is provided on part of the smart card, and the reflection layer and the photosensor are provided in the fingerprint recognition area.

* * * * *